US009866251B2

(12) United States Patent
Ohki et al.

(10) Patent No.: US 9,866,251 B2
(45) Date of Patent: Jan. 9, 2018

(54) GESTURE DETECTION TO PAIR TWO WEARABLE DEVICES AND PERFORM AN ACTION BETWEEN THEM AND A WEARABLE DEVICE, A METHOD AND A SYSTEM USING HEAT AS A MEANS FOR COMMUNICATION

(71) Applicant: SONY CORPORATION, Tokyo (JP)

(72) Inventors: Yoshihito Ohki, Tokyo (JP); Kae Okazawa, Kanagawa (JP); Masafumi Hamada, Arloev (SE); Kenny Lovrin, Malmö (SE); Billy Moren, Malmö (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/493,647

(22) Filed: Apr. 21, 2017

(65) Prior Publication Data
US 2017/0222677 A1    Aug. 3, 2017

Related U.S. Application Data

(63) Continuation of application No. 15/221,105, filed on Jul. 27, 2016, now Pat. No. 9,667,767, which is a
(Continued)

(51) Int. Cl.
*H04B 1/38*      (2015.01)
*H04B 1/3827*    (2015.01)
(Continued)

(52) U.S. Cl.
CPC ............ *H04B 1/385* (2013.01); *G06F 3/016* (2013.01); *G06F 3/017* (2013.01); *G06F 3/0346* (2013.01)

(58) Field of Classification Search
USPC .......................... 455/417; 340/407.1, 573.1
See application file for complete search history.

(56) References Cited

U.S. PATENT DOCUMENTS 9,473,606 B1    10/2016  Sumida
9,504,387 B2 *  11/2016  Alonsoperez
                         Lanza .................. A61B 5/1112
(Continued)

OTHER PUBLICATIONS

Introducing TapTap, http://www.taptap.me/, accessed Jun. 23, 2014, p. 1-3.
(Continued)

*Primary Examiner* — David Q Nguyen
(74) *Attorney, Agent, or Firm* — Paratus Law Group, PLLC

(57) ABSTRACT

The present disclosure relates to devices and methods for initiating execution of actions and for communicating information to a user, and more particularly, to initiating execution of predefined actions in wearable devices and communication devices based on gestures made with the wearable devices and/or heat applied to a surface of the wearable devices. According to an aspect, the method relates to, in the wearable device, detecting a first, in the first wearable device predefined, gesture of the first wearable device, broadcasting a first signal comprising information associated with the first gesture, receiving, from a second wearable device, a second signal comprising information associated with a second gesture and initiating execution of a, in the first wearable device predefined, first action based on the first signal and the second signal.

23 Claims, 10 Drawing Sheets

Related U.S. Application Data continuation of application No. 14/322,385, filed on Jul. 2, 2014, now Pat. No. 9,432,498.

(51) Int. Cl.
*G06F 3/01* (2006.01)
*G06F 3/0346* (2013.01)

(56) References Cited

U.S. PATENT DOCUMENTS

| | | |
|---|---|---|
| 2001/0048364 A1* | 12/2001 | Kalthoff ............... G01S 5/0009 340/573.1 |
| 2012/0322430 A1 | 12/2012 | Fish et al. |
| 2014/0218184 A1 | 8/2014 | Grant et al. |
| 2014/0362014 A1 | 12/2014 | Ullrich et al. |
| 2015/0028996 A1 | 1/2015 | Agrafioti et al. |
| 2015/0043156 A1 | 2/2015 | Jain et al. |
| 2015/0346784 A1 | 12/2015 | Delano et al. |
| 2016/0118699 A1 | 4/2016 | Kim |
| 2016/0154443 A1 | 6/2016 | Tudosoiu |

OTHER PUBLICATIONS

TapTap, a touch communication wristband, https://www.kickstarter.com/projects/woodenshark/taptap-wristband-a-new-way-to-say-i-love-you/, accessed Jun. 23, 2014, p. 1-31.

* cited by examiner

ГЕСТURE DETECTION TO PAIR TWO WEARABLE DEVICES AND PERFORM AN ACTION BETWEEN THEM AND A WEARABLE DEVICE, A METHOD AND A SYSTEM USING HEAT AS A MEANS FOR COMMUNICATION

CROSS-REFERENCE TO PRIOR APPLICATION

This application is a continuation of U.S. patent application Ser. No. 15/221,105 (filed on Jul. 27, 2016), which is a continuation of U.S. patent application Ser. No. 14/322,385 (filed on Jul. 2, 2014 and issued as U.S. Pat. No. 9,432,498 on Aug. 30, 2016), which are all hereby incorporated by reference in their entirety.

TECHNICAL FIELD

The present disclosure relates to devices and methods for initiating execution of actions. In particular it relates to initiating execution of predefined actions in wearable devices and communication devices based on gestures made with the wearable devices. Moreover, the present disclosure relates to devices and methods for communicating. In particular it relates to communicating information to users of wearable devices using heat as a means.

BACKGROUND

Many people have a smartphone today and an upcoming trend is to connect the smartphone with some kind of wearable, for example a wristband or glasses.

An example of a wearable is a TapTap, a wristband which is bought in pairs and worn by two lovers or friends. When one person taps the wristband, the other wristband vibrates. The TapTap is used for letting the other person know that you are thinking of her/him.

There are several different models of wearable devices available today and most of them can e.g. be used as a pedometer, a watch or to get status updates on the connected smartphone.

The TapTap supports recognition of several gestures, such as a high five, clapping and waving. One example of gesture recognition is that the wearable illuminates.

The wearable devices have many applications but most of them are directed towards entertainment and not so much towards practical use. Some wearable devices simply function as an extended screen of the connected smartphone and some support the identification of different gestures, such as a hand shake, a high five or clapping.

In other words, there is a need to improve the usability of wearable devices.

SUMMARY

An object of the present disclosure is to provide methods and devices for initiating actions based on predefined gestures which seek to mitigate, alleviate, or eliminate the above-identified deficiency in the art.

The solution proposes that when a user performs different gestures while wearing a wearable device, the gestures, together with input from another wearable device, induce the device to perform different actions. It also addresses how to cause a communication device to perform actions.

The proposed technique relates to a method, performed in a first wearable device, of initiating execution of predefined actions.

According to one aspect, the method comprises the steps of:
detection of a first, in the first wearable device predefined, gesture of the first wearable device
broadcasting a first signal comprising information associated with the first gesture,
receiving, from a second wearable device, a second signal comprising information associated with a second gesture
initiating execution of a, in the first wearable device predefined, first action based on the first signal and the second signal.

By initiating an action based on the information in the first and the second signal, it is possible to initiate actions in the wearable device based on a combination of internal and external information. That is, an action is performed when a first wearable device and a second wearable device both perform corresponding gestures.

According to one aspect, the step of detecting a first, in the first wearable device predefined, gesture of the first wearable device further comprises the steps of:
registering a gesture made with the first wearable device
comparing the registered gesture with gestures stored in the first wearable device
determining the first gesture, wherein the first gesture is the gesture that corresponds to both the registered gesture and to one of the stored gestures.

In this way the first gesture is recognized and stored in the first wearable device.

According to one aspect, the gestures stored in the first wearable device are listed in a table of gestures. The registered gesture is compared to the stored gestures in the table. When the gestures are listed in a table, it is easy for a user to add and remove gestures from the table of gestures if the user wishes to add or remove gestures which induce an action.

According to one aspect, the first action comprises one or a combination of several of the following: lighting one or several lamps, lighting up a display on the wearable device, showing device specific information on a display, starting a vibrating device in the first wearable device, and/or storing metadata in the first wearable device. The listed actions inform the user/wearer of the wearable device of what gesture she/he has made and/or that a matching gesture of another user/wearer has been made and/or that the device stores data about the situation for later use.

According to one aspect, the metadata comprises date, time and location of the wearable device. The metadata is useful in case the user wants to keep track of who, when or where she/he meets other users.

According to one aspect, the first and/or the second signal comprise an identifier of the respective wearable device. The identifier makes it possible for receiving wearable devices to identify the sending wearable device.

According to one aspect, the first action further comprises instructing a first communication device to perform a second predefined action. The first communication device is wirelessly connected to the first wearable device. In other words, the user of the wearable device triggers an action in the wirelessly connected communication device with a gesture.

According to one aspect, the second predefined action comprises connecting to a second communication device, the second communication device being wirelessly connected to the second wearable device. In other words, the user of the wearable device triggers the first communication device to connect to a second communication device with a gesture.

According to one aspect, the first and/or the second signal comprise an identifier of the respective connected communication device. The identifier enables the first and the second communication devices to connect to each other.

According to one aspect, the broadcasting and/or receiving in the wearable device are performed using Bluetooth technology.

According to another aspect, the disclosure relates to a method, performed in a first communication device wirelessly connected to a first wearable device, of wirelessly connecting to a second communication device. The method comprises the steps of:
- receiving, from the first wearable device, an instruction to connect to the second communication device
- identifying the second communication device based on information in the instruction from the first wearable device
- connecting the first communication device and the second communication device.

In other words, the first communication device and the second communication device connect based on information sent from a wearable device.

According to one aspect the instruction further comprises instructions to perform a second predefined action and wherein the method further comprises the step of performing the second predefined action. Thus, a wearable device instructs a communication device to connect to another communication device and also to perform a second action.

According to one aspect the second predefined action comprises exchanging data with the second communication device. In this way an easy way of initiating data transfer is achieved. For example, if a user takes a picture with a communication device and wishes to send it to another communication device, she/he makes a gesture, e.g. a throwing gesture, and the user of the other communication device performs the corresponding gesture, e.g. a catching gesture, which initiates the sending of the picture.

According to one aspect the second predefined action comprises exchanging contact information with the second communication device. If two users e.g. shake hands, their communication devices exchanges contact information without any further input from the users and thus achieving an efficient and fun way of trading contact information.

According to one aspect, the first and the second communication device are any of: a mobile phone, a computer, a laptop, a handheld computer, a portable digital assistant, a tablet computer or a gaming device. In other words, the wearable device enables connection of any type of communication devices.

According to one aspect, the receiving, in the communication device, is performed using Bluetooth technology.

According to another aspect, the disclosure relates to a wearable device, configured to initiate execution of predefined actions. The wearable device comprises:
- a communication interface for communication with a second wearable device and the first communication device
- processing circuitry configured to cause the wearable device to:
  i. detect a first, in the wearable device predefined, gesture of the wearable device
  ii. broadcast, via the communication interface, a first signal comprising information associated with the first gesture
  iii. receive, via the communication interface, from the second wearable device, a second signal comprising information associated with a second gesture;
  iv. initiating execution of a, in the first wearable device predefined, first action based on the first signal and the second signal.

In other words, the wearable device is made to be able to perform the method described above.

According to another aspect, the disclosure relates to a communication device, wirelessly connected to a wearable device and configured to wirelessly connect to a second communication device. The communication device comprises:
- a communication interface for communication with the wearable device and a second communication device
- processing circuitry configured to cause the communication device to:
  i. receive, via the communication interface, an instruction from the first wearable device to connect to the second communication device
  ii. identify the second communication device based on information in the instruction from the first wearable device
  iii. connect, via the communication interface, the first communication device and the second communication device.

Thus, the communication device is made to be able to perform the method described above.

Moreover, With the above description in mind, then, an aspect of some embodiments of the present disclosure is to provide a wearable device for communicating information to a user and a method for performing the same, and this seeks to mitigate, alleviate or eliminate one or more of the above-identified deficiencies in the art and disadvantages singly or in any combination.

More specifically, it is an object of the present disclosure to provide a wearable device which uses temperature and pressure as a means for communication.

An aspect of the present disclosure relates to a wearable device comprising a communication interface for communication with at least one external device, a heat generator configured to heat a surface of the wearable device and processing circuitry configured to receive data, using the communication interface and to instruct the heat generator to produce heat based on the received data.

In other words, the disclosure provides a wearable device which uses heat produced with a heat generator to communicate with the user.

According to one aspect, the wearable device comprises an input unit configured to transform input data into a signal communicated to at least one external device. An advantage with this is that the wearable device is able to register e.g. heat and pressure on its surface to send to other devices. In other words, the user of the wearable device can communicate heat and pressure to other devices.

According to one aspect, the data comprises time duration information communicated to the user by producing said heat a specific duration of time on the surface of said wearable device. It is possible for the user to distinguish between different kinds of data by the duration of the heat.

According to one aspect, the data comprises temperature information communicated to the user by producing said heat at a specific temperature on the surface of said wearable device. In other words, the user can feel different temperatures as output from the wearable device. It is possible to show, for example, urgency levels in the data by the temperature where the hottest temperature is the most urgent indicator.

According to one aspect, the data comprises position information communicated to the user by heating a specific position on the surface of said wearable device. That is, the wearable device communicates different kinds of data to different positions on the wearable device.

According to one aspect, the data comprises pressure information and wherein said wearable device further comprises a pressure generating element configured to produce a pressure based on said pressure information on said surface of said wearable device.

It is possible to communicate information to the user with a combination of temperature and pressure. By providing a wearable device which can communicate information in data with combinations of temperature, position of the temperature and pressure, very many distinct messages are possible.

Another aspect of the present disclosure relates to a method performed in a wearable device, of communicating with a user of said wearable device, the method comprising the steps of receiving, using a communication interface of said wearable device, data from an external communication device and instructing a heat generator of said wearable device to produce heat on a surface of said wearable device based on said received data.

As previously discussed, the disclosure provides a wearable device which uses heat produced with a heat generator to communicate with the user.

According to one aspect, the method further comprises the step of processing said received data and wherein the step of instructing comprises producing heat based on the processed data.

When the data is processed a suitable way to present the data with heat is sought for so that the user of the wearable device feels the data in the right way.

Another aspect of the present disclosure relates to a communication device for communicating information to a user comprising a communication unit configured to communicate with at least one wearable device an input unit configured for heat detection and processing circuitry configured to process said detected heat into data and to send said processed data, using the communication interface to said at least one wearable device.

In other words, the communication device detects applied heat and sends data to a wearable device so that the user of the wearable device feels the heat.

Another aspect of the present disclosure relates to a system for communicating information to a user, wherein said system comprises a receiving wearable communication device comprising a communication interface for communication with at least one external device, a heat generator configured to heat a surface of said sending wearable device and processing circuitry configured to receive data, using the communication interface and to instruct the heat generator to produce heat based on the received data.

The system further comprises a sending communication device comprising a communication unit configured to communicate with a receiving wearable device, an input unit configured for heat detection and processing circuitry configured to process said detected heat into data; and to send said processed data, using the communication interface to said receiving wearable device.

In other words, the system comprises a wearable device, which is the receiving device, and a communication device which is the sending device.

The features of the above-mentioned embodiments can be combined in any combinations.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
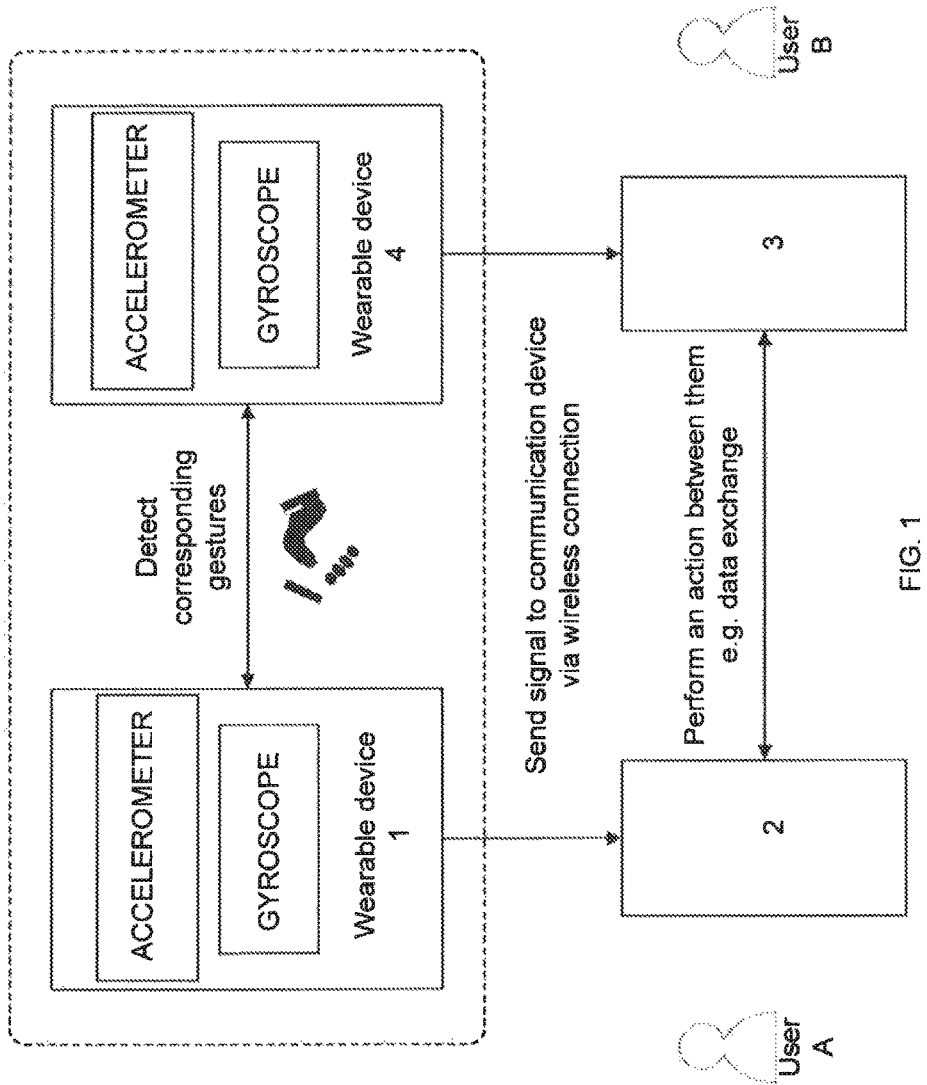
FIG. 1 shows an overview of a system with two wearable devices and two communication devices and their interaction.

Embodiments of the present disclosure will be described more fully hereinafter with reference to the accompanying drawings, in which embodiments of the disclosure are shown. The present disclosure may, however, be embodied in many different forms and should not be construed as limited to the embodiments set forth herein. Rather, these embodiments are provided so that the disclosure will be thorough and complete, and will fully convey the scope of the invention to those skilled in the art. Like reference signs refer to like elements throughout. The terminology used herein is for the purpose of describing particular embodiments only and is not intended to be limiting.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, the term "electronic device" includes portable communication device and portable radio communication equipment. Portable communication devices and mobile communication devices may be used synonymously. The term "portable radio communication equipment" may be referred to below as a mobile phone (or as a mobile telephone, portable phone or portable telephone), a portable device, a portable radio terminal or a portable terminal, includes all electronic equipment, including, but not limited to, capable of being used for voice and/or data communication.

As will be appreciated, the disclosure may be used with mobile phones, other phones, smartphones, personal digital assistants (PDAs), computers, other communication devices, etc. For brevity, the disclosure will be described by way of examples with respect to mobile phones, but it will be appreciated that the disclosure may be used with other communication devices.

It is an object of the present disclosure to extend the usability of wearable devices by communicating to an additional sense of the user.

Embodiments of the present invention will be exemplified using a communication device such as a smartphone. However, it should be appreciated that the invention is as such equally applicable to electronic devices which have communication capabilities. Examples of such devices may for instance be any type of smartphone, laptops (such as standard, ultra portables, netbooks, and micro laptops), handheld computers, portable digital assistants, tablet computers or gaming devices etc. However, for the sake of clarity and simplicity, the embodiments outlined in this specification are exemplified with, and related to, smartphones only.

It is an object of the present disclosure to extend gesture detection in wearable devices into a means for facilitating communication between users. Furthermore, gesture detection is also exploited to pair two devices and to perform an action that matches the combination of the two gestures. For example, when two persons each wearing a wearable device perform gestures, e.g. handshake, high-five, fist bump, hug, waving, etc., the wearable devices trigger a predefined action, e.g. data exchange, between the users' smartphones.

FIG. 1 shows an overview of an example of the present disclosure in use. In this example, two wearable devices 1, 4, wirelessly connected to a respective communication device 2, 3 of the users A and B, detect corresponding gestures. That is, in this exemplary case, the wearable devices detect that they have both performed a handshake. The gestures are detected with an accelerometer and a gyroscope in each of the wearable devices. When corresponding gestures, in this case handshakes, have been confirmed by the wearable devices, as will be further described below, the wireless devices send a signal to their respective communication device that they are connected to, instructing the communication devices to connect to each other and to exchange data, e.g. contact information.

Figure 2:
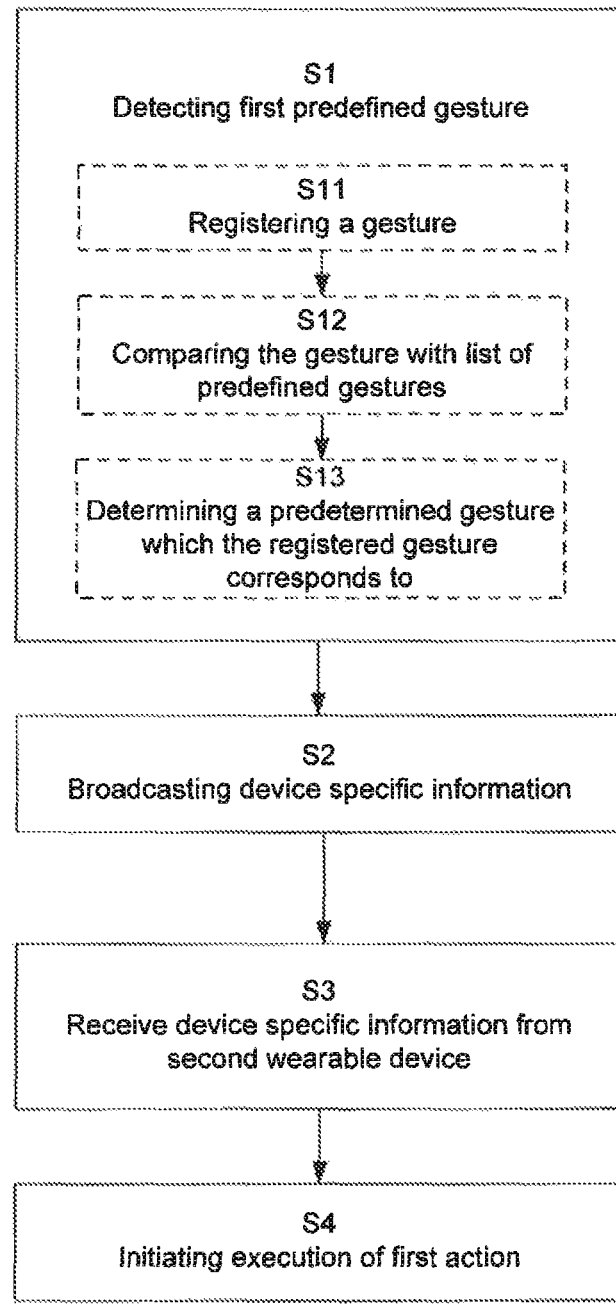
FIG. 2 illustrates the steps of the method performed in the wearable device.

FIG. 2 illustrates the method, performed in a first wearable device 1, of initiating execution of predefined actions, in steps. The first step is to detect S1 a first, in the first wearable device predefined, gesture of the first wearable device.

The detect step S1 is in turn comprised of three steps S11, S12, S13. The wearable device 1 registers S11 a gesture made with the first wearable device. The gesture is registered using at least one accelerometer and/or at least one gyroscope. The movement is measured with the accelerometer and/or gyroscope and the digital signals from them are recorded, thus producing registered data representing the gesture. The registered gesture is compared S12 with gestures stored in the first wearable device. According to one aspect, the gestures stored in the first wearable device are listed in a table of gestures. The registered gesture is compared to the stored gestures in the table. It is thereby easy for a user to add and remove gestures from the table of gestures if the user wishes to add or remove gestures which induce an action. The last step of detecting the first gesture is to determine the first gesture, wherein the first gesture is the gesture that corresponds to both the registered gesture and to one of the stored gestures. In this way the first gesture is recognized and stored in the first wearable device.

The second step of the method illustrated in FIG. 2 is to broadcast S1 a first signal comprising information associated with the first gesture. The information is broadcasted so that other wearable devices in the vicinity are notified that a gesture has been made in the first wearable device 1. The information associated with the first gesture is data representing the gesture.

The next step is to receive S3, from a second wearable device 4, a second signal comprising information associated with a second gesture. In other words, the first wearable device 1 receives information from another wearable device that the device has detected a gesture performed in that wearable device. It does not matter when this step is performed but the next step i.e. S4, will not be initiated until the information is received. According to one aspect, the first wearable device receives the second signal before detecting the first gesture S1 or before broadcasting S2 the first signal.

The last step of the method in FIG. 2 is to initiate S4 execution of a, in the first wearable 1 device predefined, first action based on the first signal and the second signal. By initiating an action based on the information in the first and the second signal, it is possible to initiate actions in the wearable device based on a combination of internal and external information. That is, an action is performed when a first wearable device 1 and a second wearable device 4 both perform corresponding gestures. According to one aspect, the data content of the first and the second signals are compared to determine what action is to be performed. According to one aspect, the first action is determined from a table of actions where information from the first and the second signals are used as parameters to find the right action in the table. According to one aspect, a function is prompted, based on the information in the first and the second signal, which initiates the first action.

According to one aspect of the present disclosure the first action depends on gestures made in three or more wearable devices. In other words, a first action is performed if the gestures have been made in three or more wearable devices.

It should be appreciated that in the block diagrams for the methods some operations are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed.

According to one embodiment of the present disclosure, the first action comprises one or a combination of several of the following: lighting one or several lamps, lighting up a display on the wearable device, showing device specific information on a display, starting a vibrating device in the first wearable device 1, and/or storing metadata in the first wearable device. The actions inform the user of the wearable device for example of what gesture has been made and/or that a matching gesture of another wearable device 4 has been made and/or that data is stored regarding the situation. An example of this is when two users wearing the wearable device make a high-five, their devices illuminate, show their names on the display and store the metadata like date, time and location of the wearable devices. Another example is when two users wearing the wearable devices perform a fist bump or hugs each other. The wearable devices then vibrate and stores metadata like date, time and location of the wearable devices. Alternatively, the metadata is sent to, and stored, on a wirelessly connected communication device 2. The metadata is useful in case the user wants to keep track of who, when or where she/he meets other users.

To be able to, for example, store metadata with information regarding the second wearable device 4, that is, the wearable device of another user, the first and/or the second signal comprise an identifier of the respective wearable device. The identifier makes it possible for the receiving wearable device to identify the sending wearable device. The identifier is e.g. an identification number of the wearable device. According to one aspect, the first and/or the second signal comprise data representing the location of the respective wearable device. The location information is useful when e.g. storing metadata about the gestures made.

According to one aspect, the first and/or the second signal comprise a time stamp generated using date and time of the wearable device. According to one aspect, the time stamps are used to check that the gestures of the first and the second wearable device are made in a suitable order or at approximately the same time. The time stamp e.g. makes it possible to measure the time difference between the gestures. Gestures may be considered corresponding only if the time difference is lower than a certain value.

There is typically also a maximum waiting time, to make sure that the wearable device does not wait for a second gesture indefinitely. The maximum waiting time instructs the wearable device to wait for detection of a second gesture, i.e. to keep the information in the first or the second signal for a certain time, for example for 3 seconds. The maximum waiting time depends on the application. If the maximum waiting time is short, no time stamps are needed. Then all gestures detected within the maximum waiting time will be considered close enough.

The first action comprises, according to one aspect, instructing a first communication device 2 to perform a second predefined action. The first communication device is wirelessly connected to the first wearable device 1. In other words, the user of the first wearable device triggers an action in the wirelessly connected communication device with a gesture. The second action is for example to store metadata received from the wearable device, to show the name of the user of the second wearable device 4 on the screen or to take a photo.

According to one aspect, the second predefined action comprises connecting to a second communication device 3, the second communication device being wirelessly connected to the second wearable device 4. In other words, the user of the first wearable device 1 triggers the first communication device 2 to connect to a second communication device with a gesture. In other words, in this case the second action involves the two communication devices connected to the fist and the second wearable devices.

In order to connect the first communication device and the second communication device, the first and/or the second signal comprise an identifier of the respective connected communication device. The identifier enables the first and the second communication devices to identify and connect to each other. The identifier comprises for example a Mobile Subscription Identification Number, MSIN, of the communication device.

The wireless connection between the wearable devices 1, 4 and the communication devices 2, 3 is using for example Bluetooth technology. Furthermore, according to one aspect, the broadcasting and/or receiving in the wearable device are performed using Bluetooth technology.

Figure 3:
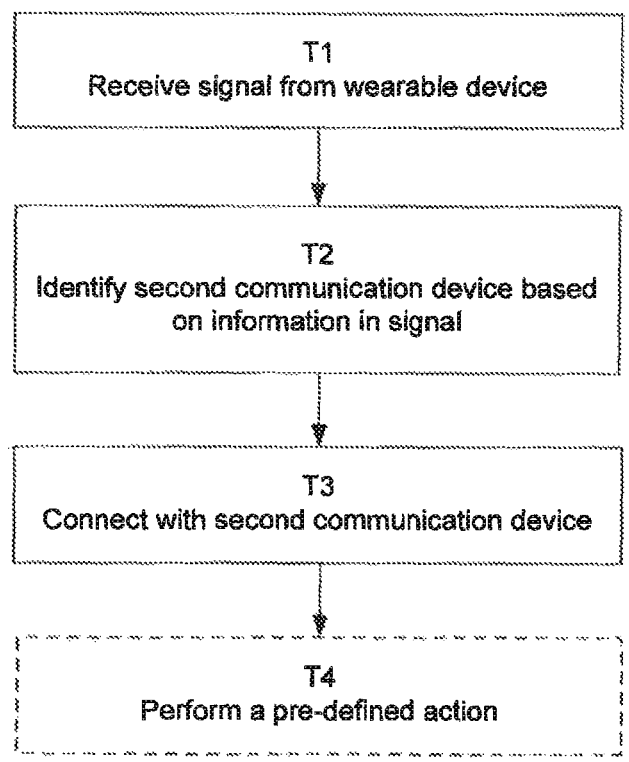
FIG. 3 illustrates the steps of the method performed in the communication device.

FIG. 3 illustrates the steps performed in a first communication device 2 wirelessly connected to a first wearable device 1, of wirelessly connecting to a second communication device 3. The first step is receiving T1, from the first wearable device, an instruction to connect to the second communication device. In this case, the first action, as described above, is to send instructions to the first communication device to connect to the second communication device.

The second step is to identify T2 the second communication device 3 based on information in the instruction from the first wearable device 1. In other words, the instructions contain an identifier of the second communication device so that the first communication 2 device is able to connect to it. The identifier comprises for example a Mobile Subscription Identification Number, MSIN, of the communication device.

The third step is to connect T3 the first communication device 2 and the second communication device 3. In other words, the first communication device and the second communication device connect based on information sent from a wearable device.

The fourth step, according to one aspect of the disclosure, is to perform T4 a second predefined action. In this case the instruction from the first wearable device 1 further comprises instructions to perform a second predefined action. Thus, a wearable device instructs a communication device to connect to another communication device and also to perform a second action.

The second predefined action comprises, for example, exchanging data with the second communication device. In this way an easy way of initiating data transfer is achieved. For example, if a user takes a picture with a communication device and wishes to send it to another communication device, she/he makes a gesture, e.g. a throwing gesture, and the user of the other communication device performs the corresponding gesture, e.g. a catching gesture, which initiates the sending of the picture. Another example is when two users are talking to each other on their smartphones and they come in to line of sight of each other they both wave with their wearable device and the smartphones automatically ends the call using the described method.

Figure 4:
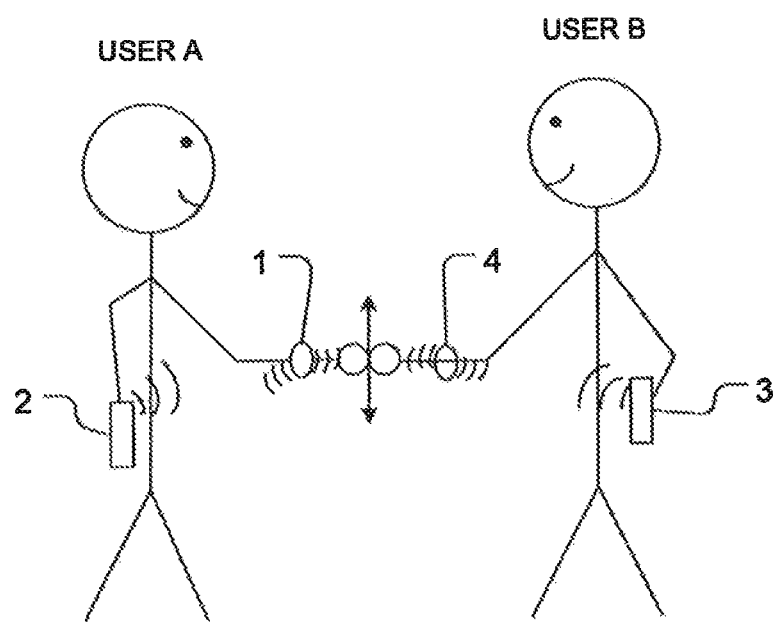
FIG. 4 shows an example of the disclosure in use.

The second predefined action comprises, according to one aspect, exchanging contact information with the second communication device 3. If two users e.g. shake hands, their communication devices exchange contact information without any further input from the users and thus achieving an efficient and fun way of trading contact information. FIG. 4 illustrates the case when users A and B shake hands. Their wearable devices 1, 4 communicate with each other on what gesture has been registered. In this example, both gestures are handshakes and the first action when both gestures are handshakes is to instruct the communication devices 2, 3 to connect to each other and to exchange contact information.

The first and the second communication device 2, 3 are for example any of: a mobile phone, a computer, a laptop, a handheld computer, a portable digital assistant, a tablet computer or a gaming device. In other words, the wearable device enables connection of any type of communication devices. According to one aspect of the disclosure, the first and the second communication devices 2, 3 are devices with wireless communication means. According to one aspect, the receiving T1 step is performed using Bluetooth technology.

Figure 5:
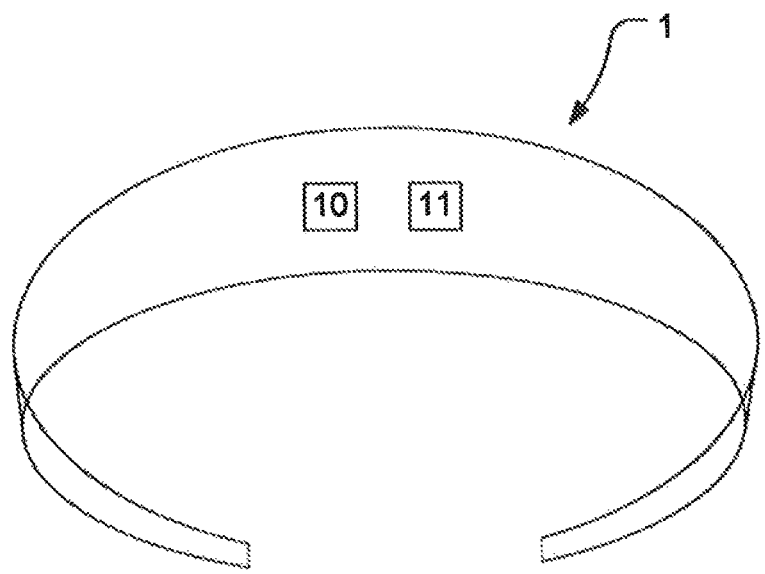
FIG. 5 is a diagram schematically illustrating a wearable device, for performing the method steps.

FIG. 5 illustrates a wearable device 1 according to one aspect of the disclosure. The wearable device is configured to initiate execution of predefined actions. The wearable device comprises a communication interface 10 for communication with a second wearable device 4 and the first communication device 2 and processing circuitry 11. The processing circuitry is configured to cause the wearable device to:
- detect S1 a first, in the wearable device predefined, gesture of the wearable device
- broadcast S2, via the communication interface, a first signal comprising information associated with the first gesture
- receive S3, via the communication interface, from the second wearable device, a second signal comprising information associated with a second gesture;
- initiating S4 execution of a, in the first wearable device predefined, first action based on the first signal and the second signal.

In other words, the wearable device is able to perform the method described above. Furthermore, the wearable device is adapted to perform the method as described above in all embodiments.

Figure 6:
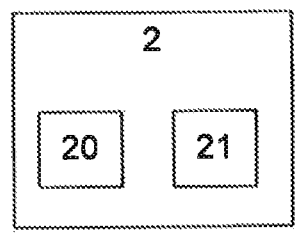
FIG. 6 is a block diagram schematically illustrating a communication device, for performing the method step.

FIG. 6 illustrates a communication device 2 according to one aspect of the invention. The communication device is wirelessly connected to a wearable device 1 and configured to wirelessly connect to a second communication device 3. The communication device comprises a communication interface 20 for communication with the wearable device and a second communication device and processing circuitry 21. The processing circuitry is configured to cause the communication device to:
- receive T1, via the communication interface, an instruction from the first wearable device to connect to the second communication device
- identify T2 the second communication device based on information in the instruction from the first wearable device
- connect T3, via the communication interface, the first communication device and the second communication device.

Thus, the communication device 2 is being able to perform the method described above. Moreover, the communication device is adapted to perform the method as described above in all embodiments.

Figure 7A:
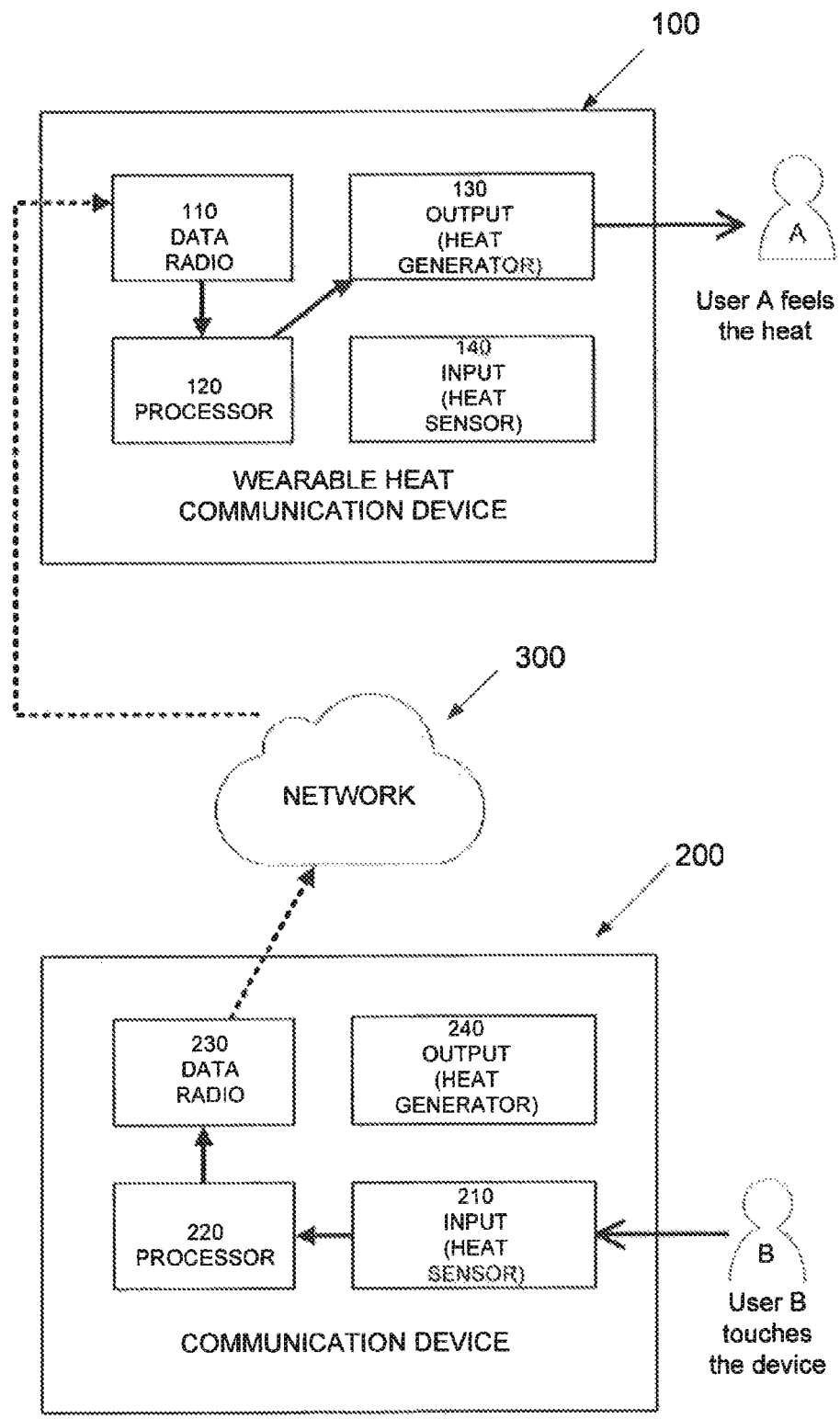
FIG. 7a discloses a view of a system comprising one receiving wearable device and one sending wearable device.

FIG. 7a illustrates a system comprising one receiving wearable device 100 and one sending wearable device 200. The wearable devices comprise a communication interface 110, 230 for communication with at least one external device. The communication interface is for example using Bluetooth, the cellular network or any other wireless communication technology 300. The wearable devices further comprise a heat generator 130, 240 configured to heat a surface of the wearable device. The surface is any surface on the wearable device; the whole surface or part of it. The surface is for example defined by a position and area. The heat generator is for example electrodes connected to a conducting material which heats up when a current is applied or a capacitor in connection to a heat conducting material. The wearable devices also comprise processing circuitry 120, 220 configured to receive data, using the communication interface and to instruct the heat generator to produce heat based on the received data. The received data is for example received from another wearable device or from an electronic device and comprises data that the processing circuitry converts to a signal to the heat generator for producing heat. In other words, the disclosure provides a wearable device which uses heat produced with a heat generator to communicate with the user.

The wearable device may also comprise an input unit 140, 210 configured to transform input data into a signal communicated to at least one external device. An advantage with this is that the wearable device is able to register e.g. heat on its surface to send to other devices. In other words, the user of the wearable device can communicate heat to other devices. A user who wishes to let someone know that she/he is thinking of that someone can apply heat to her/his wearable device and the other someone will feel the heat on her/his wearable device. The input unit is for example a heat sensor which transforms heat in to a digital signal. Heat is applied to the wearable device and detected by a heat sensor. The heat is for example body heat, heat of a liquid or heat from air.

According to one aspect, two users A, B, wearing wearable devices communicate to each other using heat. One user inputs temperature using heat sensors 140, 210 in the device, processing circuitry 120, 220 converts the heat to a signal to be sent via the communication interface 110, 230 to the other wearable device. The processing circuitry on the receiving wearable device transforms the signal to a heat signal that a heat generator 130, 240 use to generate heat.

According to one aspect, the received data is received from an electronic device, a wearable or any other communication device, and is in the form of a Short Message Service, SMS, Multimedia Messaging Service, MMS, or an audio signal. The processing circuitry converts the received data to a heat signal that the heat generator 130, 240 use to generate heat. For example, if a wearable device receives a text message with a predetermined content, such as the word "love", the wearable device heats up to make the user aware of the received message.

Figure 7B:
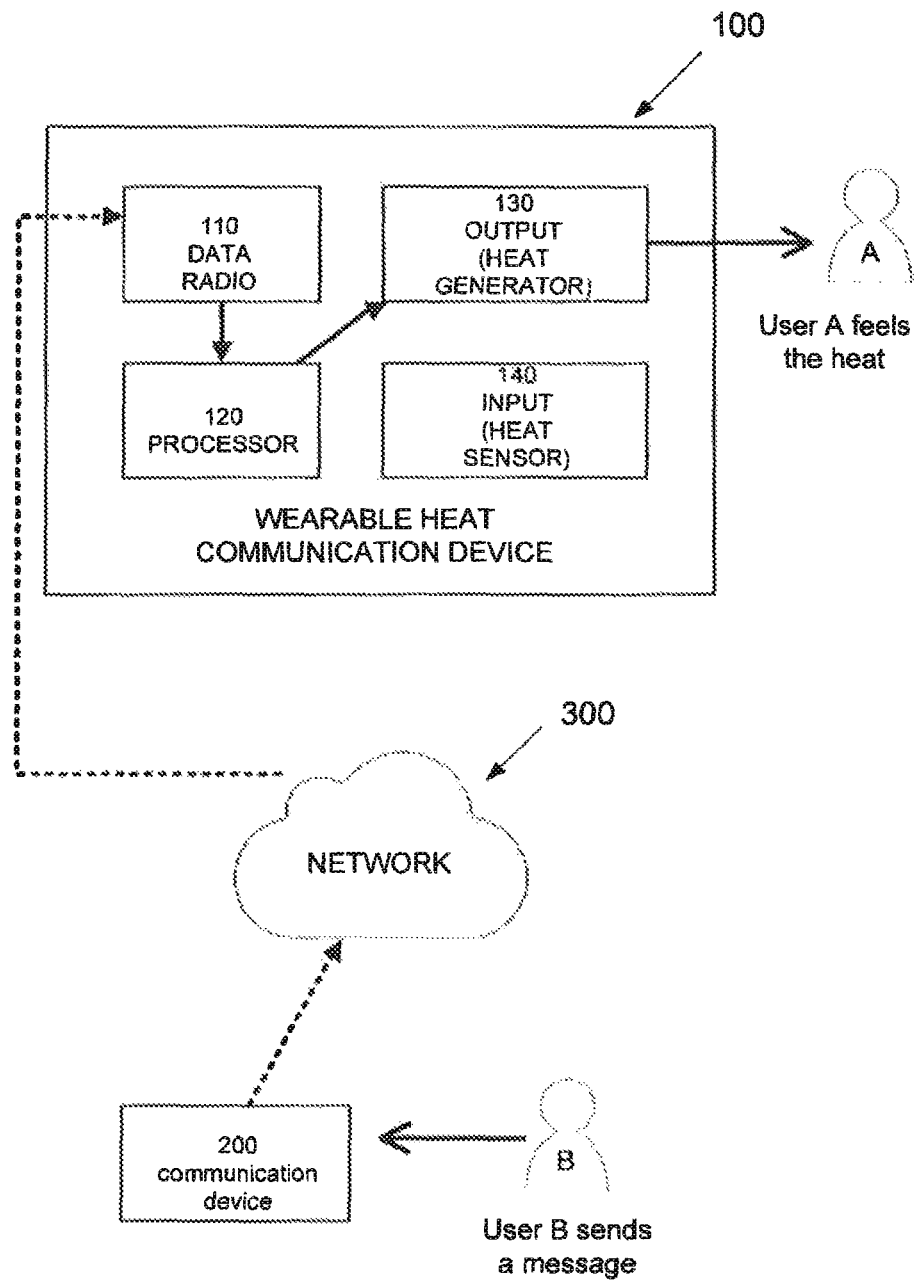
FIG. 7b discloses a view of a system comprising one receiving wearable device and one sending communication device.

FIG. 7b illustrates the present disclosure where the sending device is an electronic device 200.

It is to be understood that wearable devices are often wirelessly connected to a communication device with e.g. Bluetooth. In such cases, the embodiment of FIGS. 7a and 7b have communication devices connected between the wearable devices and the network. In the embodiment described above, where the received data is an SMS, MMS or audio signal, it is the communication device that first receives the message and then passes the information on to the wearable device.

The data received in the communication interface 110 comprises for example time duration information communicated to said user by producing said heat a specific duration of time on the surface of said wearable device. It is possible for the user to distinguish between different kinds of data by the duration of the heat. Also, when a user wishes to send heat that she/he applies to her/his wearable device, the receiving wearable device will generate heat for the same duration as the applied heat. The time duration is measured with for example a timer or a counter.

The data received in the communication interface 110 comprises for example temperature information communicated to the user by producing said heat at a specific temperature on the surface of said wearable device. In other words, the user can feel different temperatures as output from the wearable device. It is possible to show, for example, urgency levels in the data by the temperature where the hottest temperature is the most urgent indicator. An example of this is if the user wishes to be informed if there are any sounds so high that it can damage the user's ears. The user then instructs her/his communication device to instruct the wearable device to produce heat at specific temperatures depending on how high sounds the communication device registers with its microphone. Also, when a user wishes to send heat that she/he applies to her/his wearable device, the receiving wearable device will generate heat at the same temperature as the applied heat. Another example is when one sending user is abroad and wishes the receiving user to feel how warm it is, she/he sends the temperature using the described technique. The temperature is measured and checked with a temperature sensor.

In all cases, the generated heat never reaches a temperature that may be uncomfortable or cause burning to the wearer. The maximum generated temperature may be predetermined. In one aspect the maximum temperature may be predetermined to 50° C.

The data received in the communication interface 110 comprises for example position information communicated to said user by heating a specific position on the surface of said wearable device. That is, the wearable device communicates different kinds of data to different positions on the wearable device. For example, if the user is to be notified that she/he has received an SMS the wearable device produces heat on one position and if the user is to be notified of an upcoming meeting scheduled in a calendar of the electronic device the wearable device produces heat on another position. Also, when a user wishes to send heat that she/he applies to her/his wearable device, the receiving wearable device will generate heat at the same position as the applied heat. A position may be e.g. a small area, a point, half of the wearable device or the whole wearable device.

The data received in the communication interface 110 comprises for example pressure information and said wearable device comprises a pressure generating element configured to produce a pressure based on said pressure information on said surface of said wearable device. In other words, the generated heat is combined with pressure to provide further options for the users. Thus, it is possible to communicate information to the user with a combination of temperature and pressure. Pressure may be added on e.g. a small area, as a point, half of the wearable device or the whole wearable device.

By providing a wearable device which can communicate information in data with combinations of temperature, position of the temperature and pressure, very many distinct combinations are possible, that is, combinations which the user of the wearable device is capable of feeling the difference between.

Here follows some examples of the present disclosure in use:
Two users wearing the wearable device and the first user touch the device to send the heat signal to the second user as a means to communicate the presence of the first user. The signal could also comprise other information like, area, pressure, duration, etc.
Two users wearing the device. A physical contact, e.g. a hug, a hi-five, a hand shake etc., between the two generates heat on their devices.
The proximity of another device triggers the heat signal, thus if two users wearing wearable devices pass each other on the street, the surface of the wearable devices will heat up.
One user is wearing a wearable communication device. Heat is generated when notified by another communication device. Thus, heat is used as a notification instead of sound, vibration or light.
One user is wearing the wearable communication device. Heat is generated on the surface of the wearable device as a response to live music to create an enhanced sensation with the user.
Two users are wearing the wearable communication device. The users are closely related (e.g. husband and wife, mother/father and child, boyfriend and girlfriend). The first user touches the device and sends the heat signal to the second person as means to communicate the presences of the first user. The signal is processed and heat is applied to a specific predetermined position on the surface of the wearable communication device of the second user, thus the recipient, second user, knows that there is a message from that specific first person.
Pressure may be added if it is an urgent/important message that someone is sending.
The surface of the wearable communication devices heat up when two users which have registered themselves as friends are on the same train or bus or only close by.
Heat may be generated on the surface of the wearable communication device when the user passes by e.g. a popular shop or a shop with a special offer. The user has registered what places are of interest beforehand so that heat generates on the surface of the wearable communication device upon passage.

In the case where the sending device is a mobile phone or another communication device as presented before the data about time duration, temperature information, position information and/or pressure information is generated in the mobile phone instead of using a timer and sensors which is the case when the sending device is another wearable device.

The wearable device is for example a wristband, a headband, a necklace or glasses but can be any wearable device worn against the body of the user.

Figure 7C:
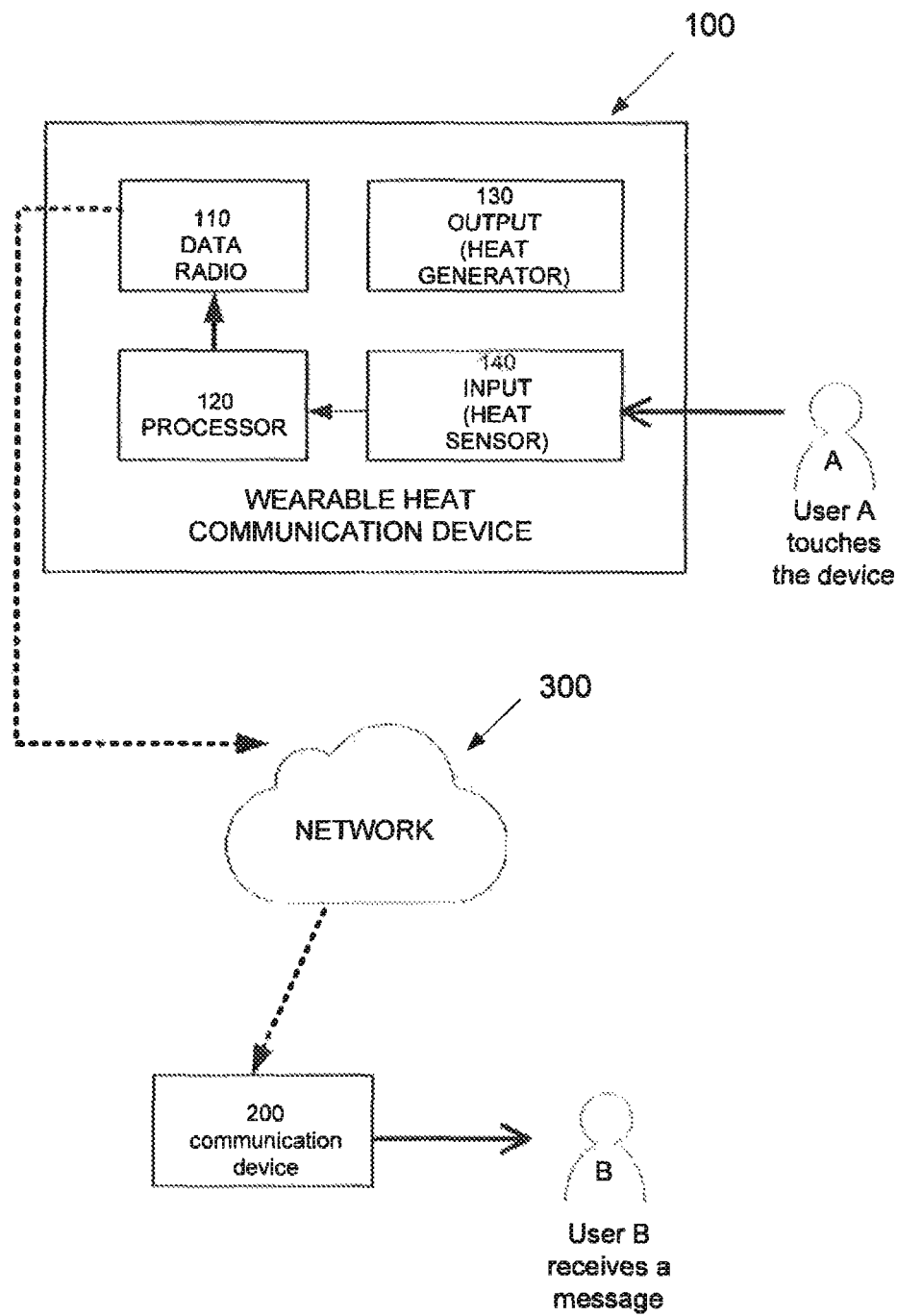
FIG. 7c discloses a view of a system comprising one receiving electronic device and one sending wearable device.

FIG. 7c shows an embodiment where the receiving user does not have a wearable device but an electronic device. In this case the heat is generated somewhere on the electronic device which the user can feel when she/he has it in her/his pocket or hand or the sent heat signal may be transformed to any of SMS, MMS or audio signal presented on the receiving device 200.

Figure 8:
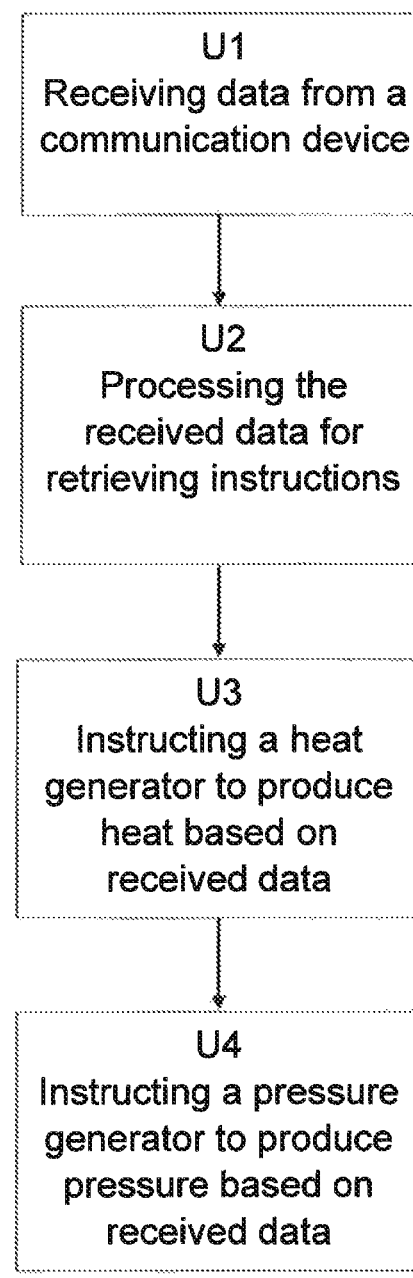
FIG. 8 discloses a flow chart of the method performed in a receiving wearable device according to the disclosure.

FIG. 8 shows a flow chart of a method performed in a wearable device 100, of communicating with a user of said wearable device, the method comprises the steps of receiving U1, using a communication interface 110 of said wearable device, data from an external communication device 200 and instructing U3 a heat generator 130 of said wearable device to produce heat on a surface of said wearable device based on said received data. In other words, the method in the wearable device enables the device to provide the functions as described above.

Step 2 in FIG. 8 is the step of processing U2 said received data according to one aspect of the disclosure. The received data is processed so that a signal instructing the heat generator is provided. The step of instructing U3 comprises producing heat based on the processed data. When the data is processed a suitable way to present the data with heat is sought for so that the user of the wearable device feels the received data in the right way. The received data is for example live music and the data is processed so that the signal to the heat generator is something that the heat generator can interpret and transfer to heat. The received data is any kind of data and the processing step makes sure that the heat generator is capable of interpreting the data into generated heat.

According to one aspect, the method in the wearable device 100 comprises steps to perform the above describes scenarios when heat is produced at specific temperatures, at specific positions, during a specific time and/or combined with pressure.

For the embodiment where the wearable device 100 produces heat at a specific position, the received data comprises position information and the step of instructing U3 further comprises instructing said heat generator 130 of said wearable device to produce heat at a position on said surface of said wearable device based on said retrieved data related to said position information.

For the embodiment where the wearable device 100 produces heat during a specific time interval, the received data comprises time interval information and the step of instructing U3 further comprises instructing said heat generator 130 of said wearable device to produce heat at duration of time on said surface of said wearable device based on said retrieved instructions related to time interval information.

For the embodiment where the wearable device 100 produces heat at a specific temperature, the received data comprises temperature information and the step of instructing U3 further comprises instructing the heat generator 130 of said wearable device to produce heat at specific temperature on said surface of said wearable device based on said retrieved instructions related to the temperature information.

For the embodiment where the wearable device 100 produces heat combined with pressure, the received data comprises pressure information and the method further comprises the step of instructing U4 a pressure generator of said wearable device to produce pressure on said surface of said wearable device based on said received data related to said pressure information.

Whether the electronic device 200 for sending communicating information to a user A is a communication device or another wearable device, it comprises a communication unit 230 configured to communicate with at least one wearable device 100, an input unit 210 configured for heat detection, a processing circuitry 220 configured to process the detected heat into data and to send the processed data, using the communication interface 230 to the at least one wearable device 100.

The input unit for heat detection is e.g. a heat sensor and the electronic device is any of e.g. a communication device, another wearable device, a smartphone, a laptop (such as standard, ultra portable, netbook, micro laptop), a handheld computer, a portable digital assistant, a tablet computer or a gaming devices etc. The electronic device detects applied heat and sends data to a wearable device so that the user of the wearable device feels the heat.

According to one aspect, the communication device 200 comprises hardware to perform the above describes scenarios when the receiving wearable device 100 produces heat at specific temperatures, at specific positions, during a specific time and/or combined with pressure. In other words, according to one aspect, the communication device 200 comprises any of, singularly or in any combination:

a time measuring element for measuring time duration of said detected heat and wherein said data comprises said time duration information.

a temperature measuring element for measuring the temperature of said detected heat and wherein said data comprises said temperature information.

position measuring element for measuring at which position said heat is detected and wherein said data comprises said position information.

a pressure measuring element for measuring a pressure generated on said surface of said wearable device and wherein said data comprises said measured pressure.

In other words, the communication device comprises hardware for measuring the properties to be sent to the receiving wearable device.

According to one aspect the present disclosure relates to a system for communicating information to a user, wherein said system comprises a receiving wearable communication device 100 comprising a communication interface 110 for communication with at least one external device 200, a heat generator 130 configured to heat a surface of the sending wearable device, processing circuitry 120 configured to receive U1 data, using the communication interface 110, and to instruct U3 the heat generator 130 to produce heat based on the received data.

The system further comprises a sending communication device 200 comprising a communication unit 230 configured to communicate with a receiving wearable device 100, an input unit 210 configured for heat detection, a processing circuitry 220 configured to process said detected heat into data and to send said processed data, using the communication interface 230 to said receiving wearable device. In other words, the system comprises a wearable device, which is the receiving device, and a communication device which is the sending device.

According to one aspect, the data according to above comprises information to perform the above describes scenarios when the receiving wearable device 100 produces heat at specific temperatures, at specific positions, during a specific time and/or combined with pressure. In other words, according to one aspect, the data comprises any of, singularly or in any combination: time duration information, temperature information, position information.

According to one aspect, the sending communication device comprises a pressure measuring element for measuring a pressure generated on said surface of said wearable device and said receiving wearable device comprises a pressure generating element configured to produce a pressure on said surface of said wearable device and said data comprises said measured pressure.

Figure 9A:
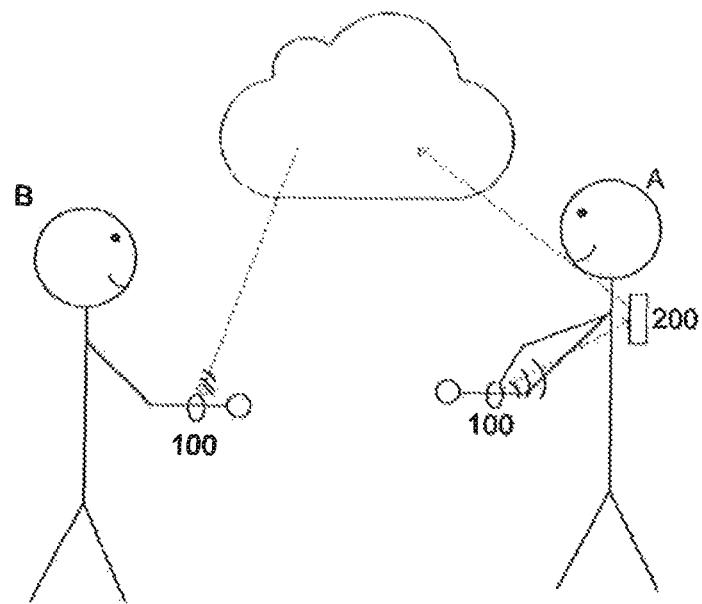
FIG. 9a-b shows a schematic illustration of an example of the disclosed method.
Figure 9B:
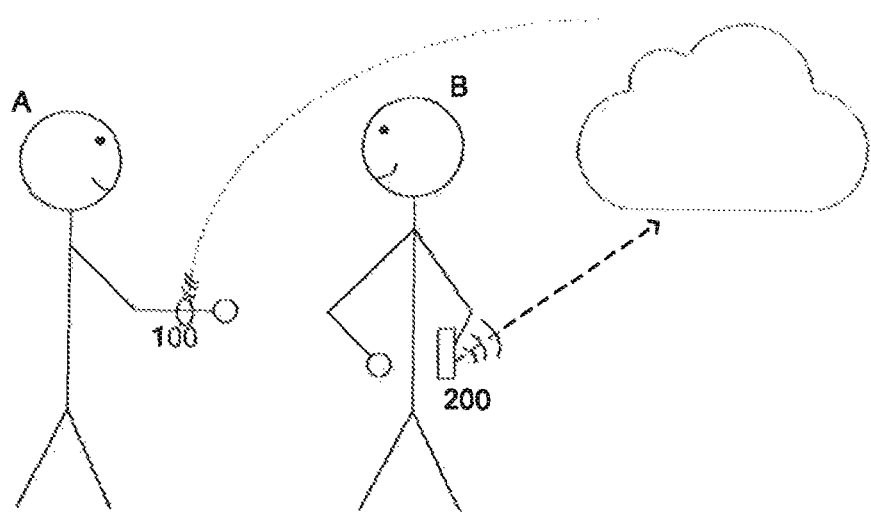

FIGS. 9a and 9b illustrates to exemplary embodiments of the disclosure. In FIG. 9a a wearable device 100 of user A communicates with the communication device 200 of user A. Furthermore, the communication device communicates with the wearable device of user B via a network. In FIG. 9b User B has no wearable device and her/his communication device communicates via a network with the wearable device 100 of user A.

The features of the above-mentioned embodiments can be combined in any combinations. According to some aspects a wearable device 1, 4, 100, 200 and a communication device 2, 3, 100, 200 comprises the above mentioned components for use in gesture recognition and the above mentioned components for heat input and heat output. In other words, a wearable device and a communication device may perform gesture detection according to above and heat input/output according to above.

Incidentally, it is possible to perform execution of the above-described series of processes using hardware, or it is possible to perform execution using software. In a case where the series of processes is performed using software, the program configuring the software is installed in a computer and/or stored in a non-transitory computer readable storage medium.

[Other Configurations of Present Disclosure]

Additionally, the present technology may also be configured as below.

(1). A method, performed in a first wearable device, of initiating execution of predefined actions, the method comprises the steps of:
  detecting a first, in the first wearable device predefined, gesture of the first wearable device;
  broadcasting a first signal comprising information associated with the first gesture;
  receiving, from a second wearable device, a second signal comprising information associated with a second gesture;
  initiating execution of a, in the first wearable device predefined, first action based on the first signal and the second signal.

(2). Method according to (1), wherein the step of detecting a first, in the first wearable device predefined, gesture of the first wearable device further comprises:
  registering a gesture made with the first wearable device;
  comparing the registered gesture with gestures stored in the first wearable device;
  determining the first gesture, wherein the first gesture is the gesture that corresponds to both the registered gesture and to one of the stored gestures.

(3). Method according to (2), wherein the gestures stored in the first wearable device are listed in a table of gestures.

(4). Method according to any of (1) to (3), wherein the first action comprises one or a combination of several of the following: lighting one or several lamps, lighting up a display on the wearable device, showing device specific information on a display, starting a vibrating device in the first wearable device and/or storing metadata in the first wearable device.

(5). Method according to (4), wherein the metadata comprises date, time and location of the wearable device.

(6). Method according to any of (1) to (5), wherein the first and/or the second signal comprises an identifier of the respective wearable device.

(7). Method according to any of (1) to (6), wherein the first action further comprises instructing a first communication device, the first communication device being wirelessly connected to the first wearable device, to perform a second predefined action.

(8). Method according to (7), wherein the second predefined action comprises connecting to a second communication device, the second communication device being wirelessly connected to the second wearable device.

(9). Method according to any of (7) or (8), wherein the first and/or the second signal comprise an identifier of the respective connected communication device.

(10). Method according to any of (7) to (9), wherein the first and the second communication devices are any of: a smartphone, a computer, a laptop, a handheld computer, a portable digital assistant, a tablet computer or a gaming device.

(11). Method according to any of (1) to (10), wherein the broadcasting and/or receiving are performed using Bluetooth technology.

(12). A method, performed in a first communication device wirelessly connected to a first wearable device, of wirelessly connecting to a second communication device, the method comprising the steps of:
  receiving, from the first wearable device, an instruction to connect to the second communication device;
  identifying the second communication device based on information in the instruction from the first wearable device;
  connecting the first communication device and the second communication device.

(13). Method according to (12), wherein the instruction further comprises instructions to perform a second predefined action and wherein the method further comprises the step of:
  performing the second predefined action.

(14). Method according to (13), wherein the second predefined action comprises exchanging data with the second communication device.

(15). Method according to (14), wherein the second predefined action comprises exchanging contact information with the second communication device.

(16). Method according to any of (12) to (15), wherein the first and the second communication device are any of: a mobile phone, a computer, a laptop, a handheld computer, a portable digital assistant, a tablet computer or a gaming device.

(17). Method according to any of (12) to (16), wherein the receiving is performed using Bluetooth technology.

(18). A wearable device, configured to initiate execution of predefined actions, the wearable device comprising:
  a communication interface for communication with a second wearable device and the first communication device;
  processing circuitry configured to cause the wearable device to
  i. detect a first, in the wearable device predefined, gesture of the wearable device;
  ii. broadcast, via the communication interface, a first signal comprising information associated with the first gesture;
  iii. receive, via the communication interface, from the second wearable device, a second signal comprising information associated with a second gesture;
  iv. initiating execution of a, in the first wearable device predefined, first action based on the first signal and the second signal.

(19). A communication device, wirelessly connected to a wearable device and configured to wirelessly connect to a second communication device, comprising:
  a communication interface for communication with the wearable device and a second communication device;
  processing circuitry configured to cause the communication device to:
  i. receive, via the communication interface, an instruction from the first wearable device to connect to the second communication device;
  ii. identify the second communication device based on information in the instruction from the first wearable device;
  iii. connect, via the communication interface, the first communication device and the second communication device.

(20). A wearable device for communicating information to a user, wherein said wearable device comprising:
  a communication interface for communication with at least one external device;
  a heat generator configured to heat a surface of the wearable device;
  processing circuitry configured:
  i. to receive data, using the communication interface; and
  ii. to instruct the heat generator to produce heat based on the received data.

(21). The wearable device according to (20), comprising an input unit configured to transform input data into a signal communicated to at least one external device.

(22). The wearable device according to (20), wherein said data comprises time duration information communicated to said user by producing said heat a specific duration of time on the surface of said wearable device.

(23). The wearable device according to (20), wherein said data comprises temperature information communicated to said user by producing said heat at a specific temperature on the surface of said wearable device.

(24). The wearable device according to (20), wherein said data comprises position information communicated to said user by heating a specific position on the surface of said wearable device.

(25). The wearable device according to (20), wherein said data comprises pressure information and wherein said wearable device further comprises:
 a pressure generating element configured to produce a pressure based on said pressure information on said surface of said wearable device.

(26). A method, performed in a wearable device, of communicating with a user of said wearable device, the method comprising the steps of:
 receiving, using a communication interface of said wearable device, data from an external communication device; and
 instructing a heat generator of said wearable device to produce heat on a surface of said wearable device based on said received data.

(27). The method according to (26), wherein the method further comprising the steps of:
 processing said received data; and
wherein the step of instructing comprises producing heat based on the processed data.

(28). The method according to any of claim (26) or (27), wherein the received data comprises position information and wherein said step of instructing further comprises:
 instructing said heat generator of said wearable device to produce heat at a position on said surface of said wearable device based on said retrieved data related to said position information.

(29). The method according to any of claim (26)-(28), wherein the received data comprises time interval information and said step of instructing the heat generator further comprises:
 instructing said heat generator of said wearable device to produce heat at duration of time on said surface of said wearable device based on said retrieved instructions related to time interval information.

(30). The method according to any of claim (26)-(29), wherein said received data comprises temperature information and the step of instructing the heat generator further comprises:
 instructing the heat generator of said wearable device to produce heat at specific temperature on said surface of said wearable device based on said retrieved instructions related to the temperature information.

(31). The method according to any of (26)-(30), wherein said received data comprises pressure information and the method further comprising the step of:
 instructing a pressure generator of said wearable device to produce pressure on said surface of said wearable device based on said received data related to said pressure information.

(32). A communication device for communicating information to a user comprising:
 a communication unit configured to communicate with at least one wearable device;
 an input unit configured for heat detection;
 a processing circuitry configured:
 i. to process said detected heat into data; and
 ii. to send said processed data, using the communication interface to said at least one wearable device.

(33). The communication device according to (32), wherein the communication device further comprises:
 a time measuring element for measuring time duration of said detected heat; and
wherein said data comprises said time duration information.

(34). The communication device according to (32), wherein the communication device further comprises:
 a temperature measuring element for measuring the temperature of said detected heat;
wherein said data comprises said temperature information.

(35). The communication device according to claim (32), wherein the communication device further comprises:
 position measuring element for measuring at which position said heat is detected;
wherein said data comprises said position information.

(36). The communication device according to (12), wherein the communication device further comprises:
 a pressure measuring element for measuring a pressure generated on said surface of said wearable device; and
wherein said data comprises said measured pressure.

(37). A system for communicating information to a user, wherein said system comprising:
 a receiving wearable communication device comprising:
 a communication interface for communication with at least one external device;
 a heat generator configured to heat a surface of said sending wearable device;
 processing circuitry configured:
 to receive data, using the communication interface; and
 to instruct the heat generator to produce heat based on the received data; and
 a sending communication device comprising:
 a communication unit configured to communicate with a receiving wearable device;
 an input unit configured for heat detection;
 a processing circuitry configured:
 to process said detected heat into data; and
 to send said processed data, using the communication interface to said receiving wearable device.

(38). The system according to (37), wherein said data comprises time duration information.

(39). The system according to (37), wherein said data comprises temperature information.

(40). The system according to (37), wherein said data comprises position information.

(41). The system according to (37), wherein said sending communication device comprises:
 a pressure measuring element for measuring a pressure generated on said surface of said wearable device; and
said receiving wearable device comprises:
 a pressure generating element configured to produce a pressure on said surface of said wearable device; and
wherein said data comprises said measured pressure.

(42). A non-transitory computer readable storage medium storing a computer program for causing a first wearable device to:
 detect a first, in the first wearable device predefined, gesture of the first wearable device;
 broadcast in a first signal comprising information associated with the first gesture;

receive, from a second wearable device, a second signal comprising information associated with a second gesture;

initiate execution of a, in the first wearable device predefined, first action based on the first signal and the second signal.

(43). A non-transitory computer readable storage medium storing a computer program for causing a first communication device wirelessly connected to a first wearable device to:

receive, from the first wearable device, an instruction to connect to a second communication device;

identify the second communication device based on information in the instruction from the first wearable device;

connect the first communication device and the second communication device.

(44). A non-transitory computer readable storage medium storing a computer program for causing a wearable device to:

receive, using a communication interface of said wearable device, data from an external communication device; and instruct a heat generator of said wearable device to produce heat on a surface of said wearable device based on said received data.

The invention claimed is:

1. A system comprising:
a first information processing apparatus, comprising:
   a communication interface;
   a heat sensor; and
   a circuitry configured to:
      generate a signal based on a temperature detected by the heat sensor, and
      send the signal to a second information processing apparatus, using the communication interface of the first information processing apparatus, and
the second information processing apparatus, comprising:
   a communication interface;
   a heat generator configured to heat a surface of a device housing the second information processing apparatus; and
   a circuitry configured to:
      receive data from the first information processing apparatus, using the communication interface of the second information processing apparatus, and
      instruct the heat generator to generate heat at a specific temperature based on the received data, wherein the specific temperature corresponds to the temperature detected by the heat sensor.

2. The system according to claim 1, wherein the received data comprises position information, and
wherein the circuitry of the second information processing apparatus is further configured to instruct the heat generator to generate heat, based on the position information.

3. The system according to claim 1, wherein the received data comprises time interval information, and
wherein the circuitry of the second information processing apparatus is further configured to instruct the heat generator to generate heat for a duration of time, based on the time interval information.

4. The system according to claim 1, wherein the device housing the second information processing apparatus is any of: a mobile phone, a smart phone, a computer, a laptop, a handheld computer, a portable digital assistant, a tablet computer, or a gaming device.

5. The system according to claim 1, wherein the circuitry of the second information processing apparatus is further configured to control a heat production of the heat generator if the output from the heat sensor exceeds a predetermined threshold.

6. The system according to claim 1, wherein the second information processing apparatus is a wearable device.

7. The system according to claim 1, wherein the second information processing apparatus further comprises:
a pressure generator configured to generate a pressure.

8. The system according to claim 7, wherein the circuitry of the second information processing apparatus is further configured to instruct the pressure generator to generate the pressure based on the received data.

9. The system according to claim 8, wherein the circuitry of the second information processing apparatus is further configured to instruct the heat generator and the pressure generator to generate the heat and the pressure at a same time.

10. The system according to claim 8, wherein the circuitry of the second information processing apparatus is further configured to instruct the heat generator and the pressure generator to generate the heat and the pressure at a same specific position on the surface of the device housing the second information processing apparatus.

11. The system according to claim 1, wherein the first information processing apparatus further comprises:
a pressure measuring element configured to measure a pressure generated on the surface of the device housing the second information processing apparatus.

12. The system according to claim 1, wherein the specific temperature is a same temperature as the temperature detected by the heat sensor.

13. A method comprising:
generating a signal based on a temperature detected by a heat sensor;
sending the signal, using a communication interface, to an information processing apparatus;
receiving data, using the communication interface, from the information processing apparatus; and
heating a surface of a device housing the information processing apparatus, based on the received data,
wherein the surface of the device is heated to a specific temperature corresponding to the temperature detected by the heat sensor.

14. The method according to claim 13, wherein the received data comprises position information, and
wherein the surface of the device housing the information processing apparatus is heated based on the position information.

15. The method according to claim 13, wherein the received data comprises time interval information, and
wherein the surface of the device housing the information processing apparatus is heated for a duration of time, based on the time interval information.

16. The method according to claim 13, wherein the device housing the information processing apparatus is any of: a mobile phone, a smart phone, a computer, a laptop, a handheld computer, a portable digital assistant, a tablet computer, or a gaming device.

17. The method according to claim 13, wherein the heating is controlled when the output from the heat sensor exceeds a predetermined threshold.

18. The method according to claim 13, wherein the device housing the information processing apparatus is a wearable device.

19. The method according to claim 13, further comprising:
generating a pressure for application to the surface of the device housing the information processing apparatus, based on the received data.

20. The method according to claim 19, wherein the pressure is generated at a same time the surface of the device housing the information processing apparatus is heated.

21. The method according to claim 19, wherein the device housing the information processing apparatus is heated at a specific position on the surface of the device housing, and the generated pressure is applied to the same specific position on the surface of the device housing.

22. The method according to claim 13, further comprising:
measuring a pressure generated on the surface of the device housing the information processing apparatus.

23. An information processing apparatus, comprising:
a communication interface configured to communicate with at least one external device;
a heat generator configured to heat a surface of a device housing the information processing apparatus;
a heat sensor; and
a circuitry configured to:
generate a signal based on a temperature detected by the heat sensor,
send the signal, using the communication interface, to the at least one external device,
receive data, using the communication interface, from the at least one external device, and
instruct the heat generator to generate heat at a specific temperature based on the received data, wherein the specific temperature corresponds to the temperature detected by the heat sensor.

* * * * *